(12) United States Patent
Hart et al.

(10) Patent No.: US 11,264,693 B2
(45) Date of Patent: Mar. 1, 2022

(54) ANTENNA MOUNTING SYSTEM (71) Applicant: DEERE & COMPANY, Moline, IL (US)

(72) Inventors: Casey J. Hart, Asbury, IA (US); Amy C. Carlson, Naperville, IL (US); John S. Foltz, Dubuque, IA (US); Nilesh T. Kumbhar, Karad (IN)

(73) Assignee: Deere & Company, Moline, IL (US)

( * ) Notice: Subject to any disclaimer, the term of this patent is extended or adjusted under 35 U.S.C. 154(b) by 294 days.

(21) Appl. No.: 16/704,870

(22) Filed: Dec. 5, 2019

(65) Prior Publication Data
US 2021/0175599 A1 Jun. 10, 2021

(51) Int. Cl.
*H01Q 1/12* (2006.01)
*B60R 11/00* (2006.01)
*H01Q 1/32* (2006.01)

(52) U.S. Cl.
CPC ........... *H01Q 1/1214* (2013.01); *B60R 11/00* (2013.01); *H01Q 1/3275* (2013.01); *B60R 2011/004* (2013.01)

(58) Field of Classification Search
CPC .. H01Q 1/1214; H01Q 1/3275; H01Q 1/3233; H01Q 21/08
See application file for complete search history.

(56) References Cited

U.S. PATENT DOCUMENTS

| | | | |
|---|---|---|---|
| 8,506,004 B1 * | 8/2013 | Vogel | B62D 35/001 296/180.1 |
| 2014/0324291 A1 | 10/2014 | Jones et al. | |
| 2017/0178428 A1 * | 6/2017 | Watermann | G01D 5/48 |
| 2018/0143625 A1 * | 5/2018 | Nelson | G05B 19/042 |
| 2018/0151939 A1 * | 5/2018 | Hashimoto | H01Q 1/1278 |
| 2018/0176740 A1 * | 6/2018 | Goraya | H04W 4/023 |
| 2019/0100205 A1 * | 4/2019 | Kean | B60W 30/18009 |
| 2019/0101641 A1 * | 4/2019 | Hogan | G01S 13/885 |
| 2021/0122391 A1 * | 4/2021 | Hanada | B60W 60/001 |

* cited by examiner

Primary Examiner — Lam T Mai (57) ABSTRACT

Systems and methods for mounting antennas to a vehicle provide for reducing a height by which the antennas extend from a vehicle while maintaining the antennas as the furthest extending component in a vertical direction from the vehicle. The systems and methods also maintain antennas towards an interior of the vehicle, such as inward of a leading edge of the vehicle, in order to reduce risk of damage, displacement, or both of the antennas.

20 Claims, 10 Drawing Sheets

ANTENNA MOUNTING SYSTEM

FIELD OF THE DISCLOSURE

The present disclosure relates generally to antenna mounting and, particularly, geopositioning antenna mounting locations on mobile equipment.

BACKGROUND OF THE DISCLOSURE

Work vehicles, such as track loaders and skid steer loaders, are used for a variety of functions. Those functions may depend, for example, on an attachment coupled to the work vehicles. Information regarding operation of the work vehicle may be desirable, such as position and a direction information.

SUMMARY OF THE DISCLOSURE

A first aspect of the present disclosure is directed to a vehicle that includes a frame, a cab mounted to the frame, and a first antenna coupled to the cab. The cab may define an interior cab space and includes a side panel defining a first side of the interior cab space and a roof defining a second side of the interior cab space. The roof may include a peripheral portion extending beyond the side panel and edge formed along the peripheral portion. The first antenna may be coupled to the cab such that the antenna is located inwards of the edge.

A second aspect of the present disclosure is directed to a work vehicle. The work vehicle may include a frame and a cab mounted to the frame, the cab defining an interior cab space. The cab may include a first side panel defining a first side of the interior cab space, a second side panel defining a second side opposite the first side, and a roof extending from the first side panel to the second side panel and defining a third side. The first side may define a front side of the work vehicle. The second panel may define a rear side of the work vehicle. The first side, the second side, and the third side may define, at least partially, the interior cab space. The roof may include a peripheral portion extending beyond the first side panel. The work vehicle may also include a first antenna coupled to the cab such that the antenna is located inwards of the edge and a first bracket adapted to couple the first antenna to a first corner of the roof along the peripheral portion. The first bracket may include a first planar portion; a second planar portion overlaying and contacting the first planar portion; and a first mounting aperture formed in the first planar portion. The first planar portion may include a first surface configured to abut the roof of the cab. The second planar portion may abut the first planar portion.

The various aspects of the present disclosure may include one or more of the following features. A mounting aperture may be formed in the peripheral portion. The mounting aperture may be used to mount the first antenna to the cab. A bracket may also be included. The bracket may include a first planar portion and a second planar portion overlaying and contacting the first planar portion. The first planar portion may include a first surface configured to abut the roof of the cab, and the second planar portion may contact the first planar portion. The first planar portion may also include a second surface opposite the first surface. The second planar portion may include a first surface and a second surface opposite the first surface. The second surface of the first planar portion may abut the first surface of the second planar portion. The first antenna may mount to the second surface of the second planar portion. The first surface of the first planar portion may be parallel to the second surface of the second planar portion. A first mounting aperture may be formed in the peripheral portion. The bracket may include a second mounting aperture formed in the first planar portion. The first mounting aperture may be aligned with the second mounting aperture, and the aligned first mounting aperture and second mounting aperture may be configured to receive a fastener to secure the bracket to the roof. The second planar portion may include an aperture, and the aperture may be configured to receive a fastener to secure the antenna to the bracket. The first planar portion and the second planar portion may form a unitary, integrally formed component.

The various aspects may also include one or more of the following features. A second antenna may also be included, and the first antenna and the second antenna may be located at common distance relative to the roof. A base of the first antenna and a base of the second antenna may be located on a common plane. The first antenna may be coupled at a first corner of the roof, and the second antenna may be coupled to a second corner of the frame diagonally offset from the first corner. A bracket may be configured to connect the second antenna to the frame and may include a stem, a first lateral portion extending from a first end the stem, and a second lateral portion extending from a second end of the stem. The first lateral portion may be laterally offset from the second lateral portion. The first lateral portion may extend along a portion of the frame and offset from a surface of the frame on a side of the frame opposite the cab. The second lateral portion may be attached to a side of the frame. A wiring harness may extend from the antenna. The antenna may extend from outwardly from the cab in a first direction. The wiring harness may extend in a second direction opposite the first direction, and the wiring harness may extend into the interior cab space via an opening formed in the side panel. The peripheral portion of the roof may define a recess, and the wiring harness may extend through the recess. The roof may include a central portion overlaying the interior cabin space. The peripheral portion may extend beyond central portion, and the central portion may be free of a mounting aperture for coupling the antenna to the roof. The vehicle may be a tracked loader or a skid steer. A portion of the antenna at a location having the greatest distance measured perpendicular to the roof may define an outermost portion of the vehicle that extends from the roof of the cab.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to mounting systems for geopositioning antennas on work vehicles. The mounting systems provide for ensuring the geopositioning antennas are located at positions that define a highest point of the work vehicle when the work vehicle is viewed is in a conventional orientation on flat ground and when any attachment of the work vehicle is in a non-extended or lowered condition. A conventional orientation represents the work vehicle being oriented such that normal operation of the work vehicle can be performed. For example, a conventional orientation may involve having the tracks or wheels of the vehicle contacting the ground in a manner that allows the work vehicle to function as intended. Consequently, without in any way limiting the scope, interpretation, or application of the claims appearing below, a technical effect of one or more of the example implementations disclosed herein is to provide for a low-profile antenna mounting configuration that maintains a position of the geopositioning antennas above the work vehicle and while also positioning the geopositioning antennas inward of the work vehicle, particularly a geopositioning antenna located at a forward position of the work vehicle, in order to eliminate or reduce a risk of damage to the geopositioning antennas.

Figure 1:
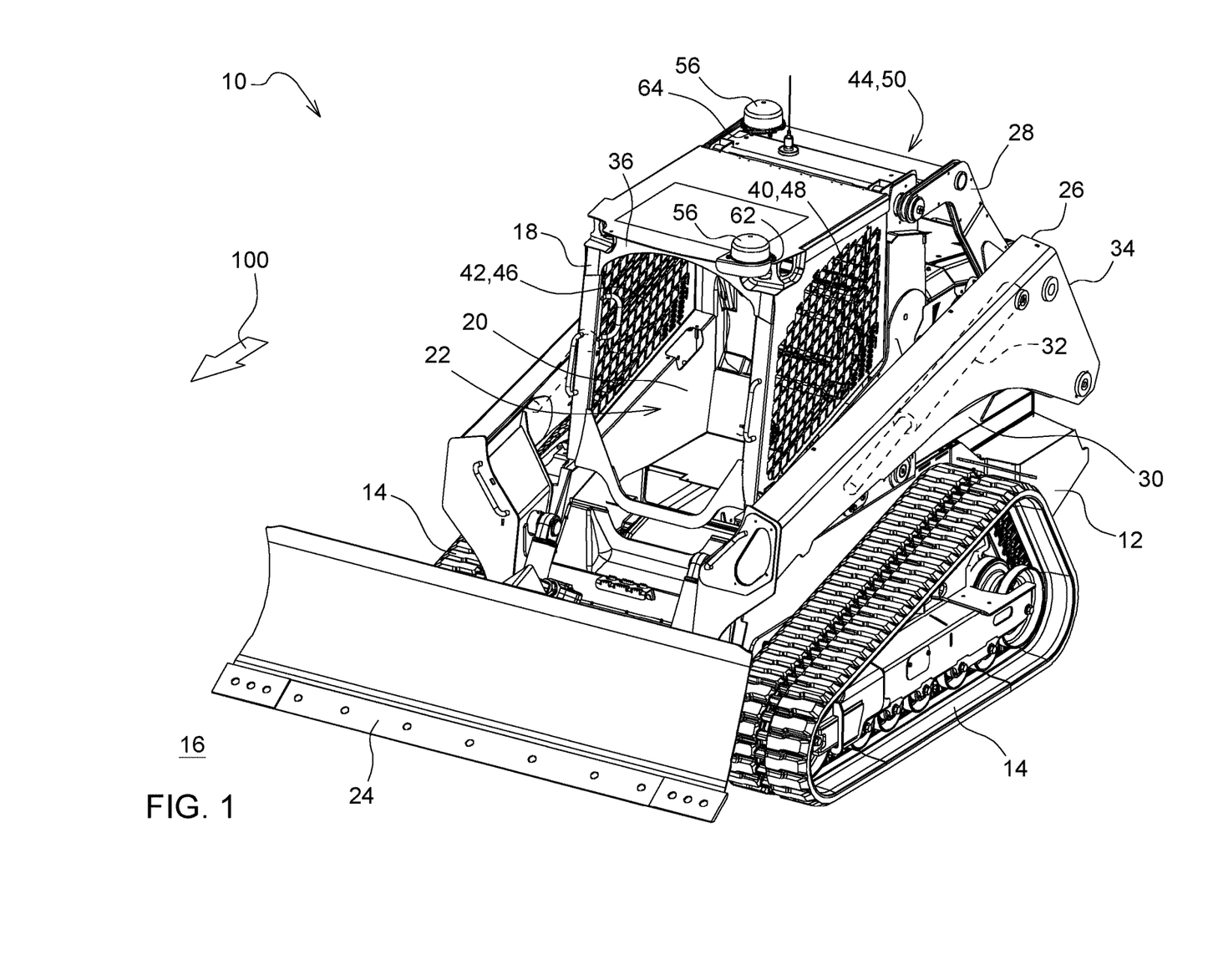
FIG. 1 is a perspective view of an example work vehicle, according to some implementations of the present disclosure.
Figure 2:
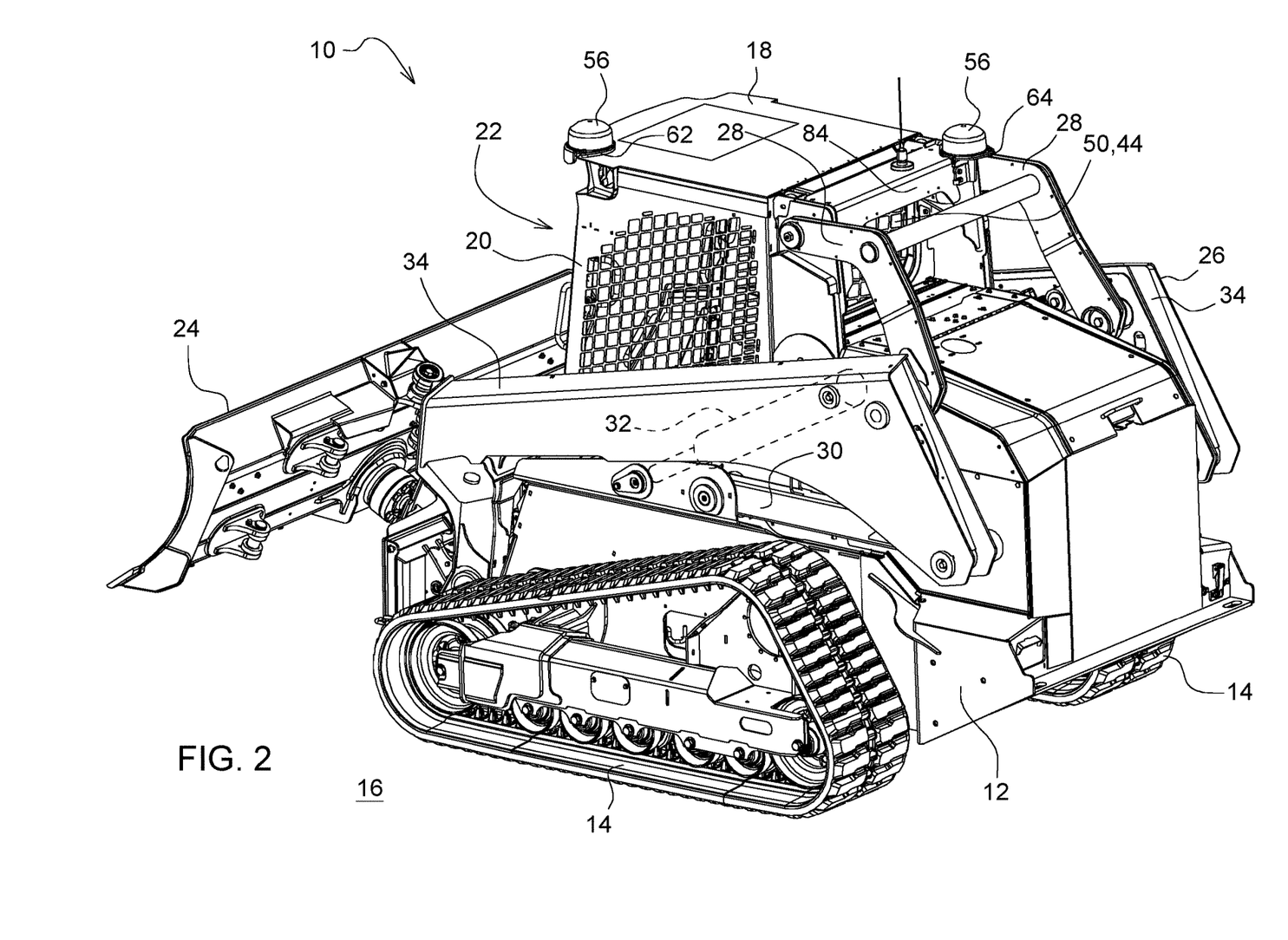
FIG. 2 is another perspective view of the work vehicle of FIG. 1, according to some implementations of the present disclosure.

FIGS. 1 and 2 illustrate an example work vehicle 10 having a frame 12. The illustrated example of the work vehicle 10 is a compact track loader. However, other types of work vehicles are contemplated and are within the scope of the present disclosure. For example, other types of work vehicles include, without limitation, skid steers and other types of agricultural, construction, or forestry equipment. The work vehicle 10 also includes a pair of tracks 14 coupled to the frame 12. The tracks 14 are configured to support the frame 12 above a surface 30 and to move the work vehicle 10 along the surface 16. In other implementations, the work vehicle 10 may include other drive components, such as a set of wheels, to transport the work vehicle 10 along the surface 16.

The work vehicle 10 also include a cab 18 defining an interior cab space 20, an opening 22, and a user interface within the cab 18. The opening 22 provides access to the interior cab space 20. In other implementations, a door having a window may be included to cover the opening 22. Controls are located within the interior cab space 20. A user interacts with the controls to operate the work vehicle 10.

The work vehicle 10 also includes an attachment 24. As shown, the attachment 24 is in the form of a dozer blade. In other implementations, the work vehicle 10 may include other types of attachments, such as snow or utility blades, scrapers, box blades, agricultural attachments, augers, trenchers, brooms, buckets, cutters, shredders, mulchers, forks, spears, grapples, hammers, cold planers, rakes, tillers, planers, rollers, snow attachments, or other types of attachments. The work vehicle 10 also includes a boom assembly 26 that is used to manipulate the attachment 24. For example, the boom assembly 26 is operable to raise and lower attachment 24 in response to user input to the control within the cab 18.

The boom assembly 26 includes a first pair of links 28 pivotally coupled to the frame 12; second pair of links 30 that are pivotally coupled to the frame 12; and a pair of boom cylinders 32 are pivotally coupled to the frame 12. The boom cylinders 32 may be hydraulic actuators or electronic actuators. A pair of boom arms 34 are pivotally coupled to the first pair of links 28 and the second pair of links 30 and positioned one per side of the work vehicle 10. The pair of boom arms 34 are pivotally coupled to the boom cylinders 32. The boom cylinders 210 are configured to move the boom assembly 26 between a lowered position to a raised position. Other boom assembly configurations are contemplated by this disclosure.

Figure 3:
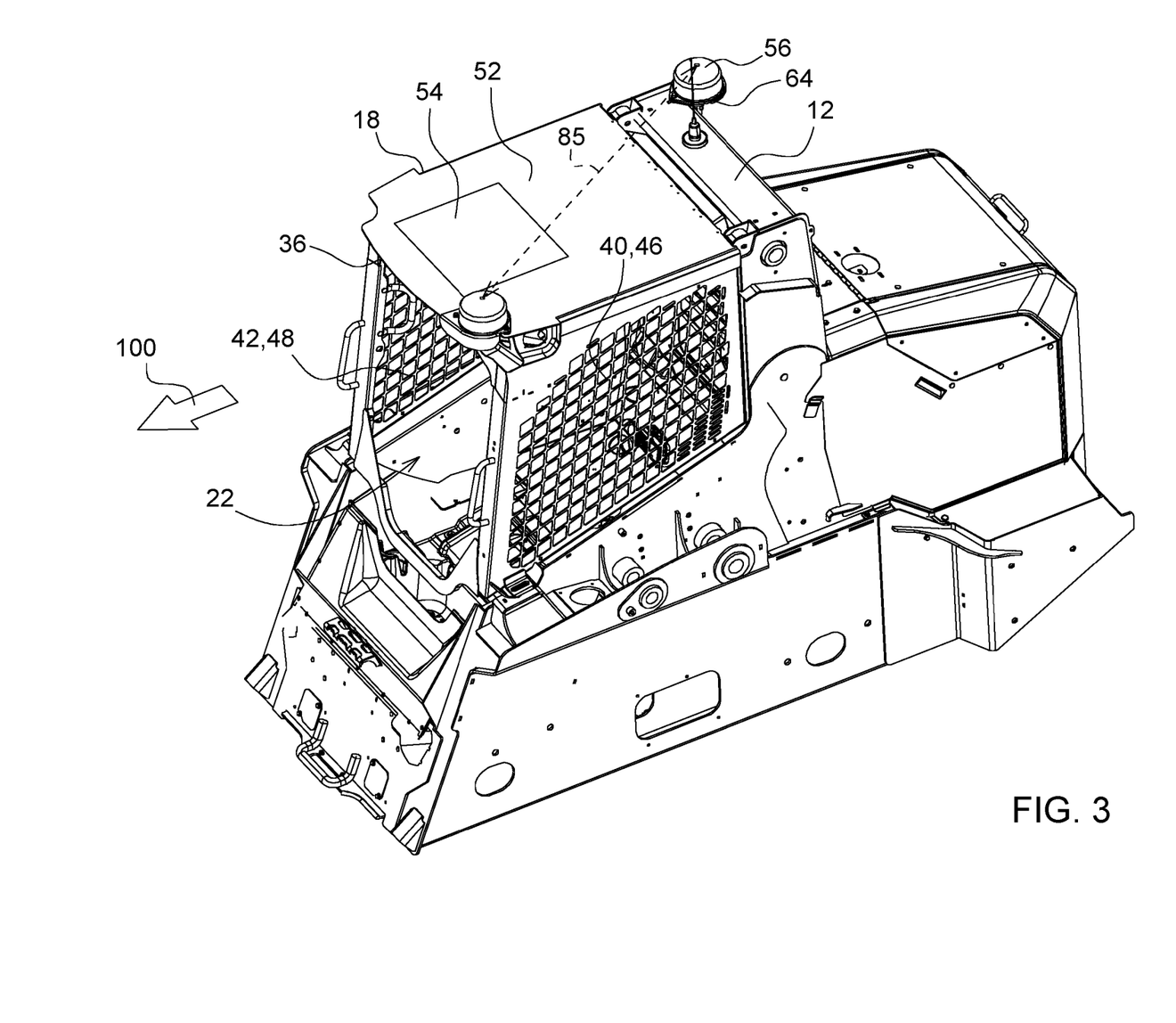
FIG. 3 is a perspective view of a portion of the work vehicle of FIG. 1, according to some implementations of the present disclosure.

FIG. 3 shows the cab 18 of the work vehicle 10. The cab 18 includes a first side panel 36. The first side panel 36 forms a front of the cab 18. The opening 22 is formed in the first side panel 36 to permit ingress and egress by a user into the interior cab space 20. The front side of the cab 18 is a side facing a forward direction of travel of the work vehicle 10, as indicated by arrow 100 in FIGS. 1 and 3. Generally, a user located in the interior cab space 20 is seated facing the opening 22 and views the exterior through the opening 22. The cab 18 also includes second and third side panels 40 and 42 located on opposing sides of the cab 18 with the first side panel 36 extending therebetween. A fourth side panel 44 is located on a side opposite the first side panel 36 and also extends between the second and third side panels 40 and 42. The fourth side panel 44 defines a back of the cab 18. The second, third, and fourth sides 40, 42, and 44 also include respective windows 46, 48, and 50 that provide the user with visibility of the exterior of the cab 18.

The cab 18 also includes a roof 52 connected to the side panels 36, 40, 42, and 44. In some implementations, the roof 52 includes a window 54 to provide visibility to the user within the interior cab space 20. The roof 52 forms another side of the cab 20 that defines the interior cab space 20. The work vehicle 10 also includes geopositioning antennas 56 that extend beyond the roof 52. With the work vehicle 10 viewed in a conventional orientation, i.e., with the tracks 14 contacting a level surface, as shown, for example, in FIG. 1, the geopositioning antennas 56 extend vertically above the roof 52 and define a greatest vertical extent of the work vehicle 10 when the boom assembly 26 is in the lowered position. Thus, the geopositioning antennas 56 extend the greatest amount above the roof 52 of the cab 18 when the boom assembly 26 is in the lowered position. One of the geopositioning antennas 56 is mounted on a forward portion of the work vehicle 10, as described in more detail below. The other of the geopositioning antennas 56 is mounted more rearward, which is also referenced as the work vehicle is a conventional orientation.

The geopositioning antennas 56 are operable to detect signals to identify a position of the work vehicle 10 on the earth. Information obtained from the geopositioning antennas 56 may also be used to provide speed and direction of movement information. The position, direction, and speed information may be provided to a user of the work vehicle 10, such as via a display located in the interior cab space 18. In some implementations, the geopositioning antennas 56 may be identical. In other implementations, the geopositioning antennas 56 may be different.

In some implementations, the geopositioning antennas 56 are configured such that bases of the antennas are disposed on a common plane. Further, even when the geopositioning antennas are different from each other, a vertical extent of each geopositioning antenna 56 (i.e., a perpendicular distance by which the geopositioning antennas 56 extend from the roof 52 work vehicle 10) may be the same. Positioning of the geopositioning antennas 56 on the work vehicle is important because it is desirable to have the geopositioning antennas 56 mounted such that a metal portion of the work vehicle 10 does not extend vertically beyond the geopositioning antennas 56, when the work vehicle 10 is viewed as setting normally on level ground. Metal extending vertically beyond or above the geopositioning antennas 56 may result in interference and reduce the efficacy of the information provided by the geopositioning antennas 56. By avoiding a metal portion of the work vehicle 10 from extending vertically beyond the geopositioning antennas 56, the information provided by the geopositioning antennas 56 has improved accuracy.

It is also desirable to have the geopositioning antennas 56 located as close to the otherwise highest point of the work vehicle 10 (again, when the work vehicle 10 is viewed as normally situated on level ground). Having the geopositioning antennas 56 mounted in this way avoids or reduces the risk of damage, such as by hanging obstructions, e.g., tree limbs or other hazards.

Figure 4:
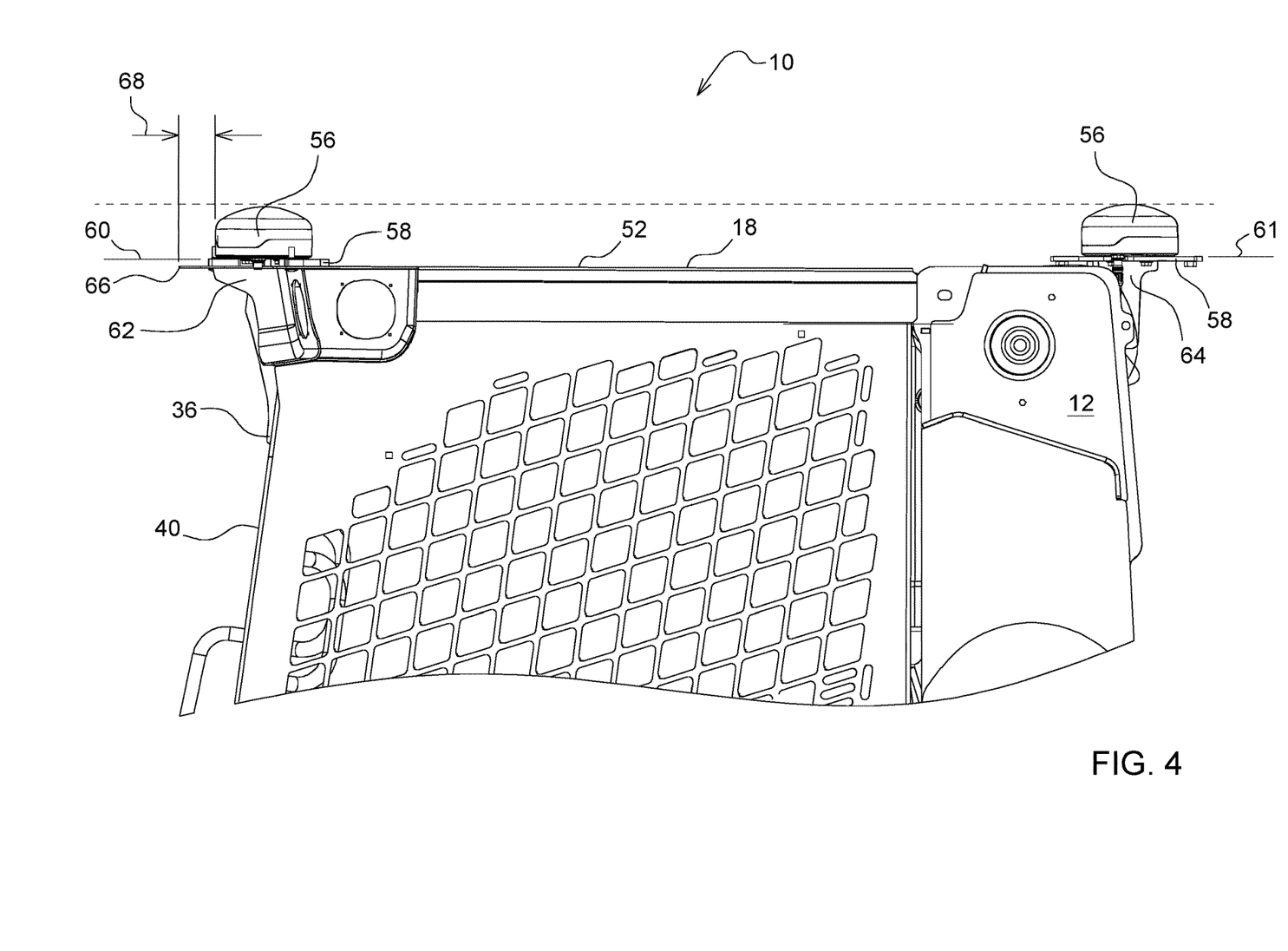
FIG. 4 is a side view of a portion of the work vehicle of FIG. 1, according to some implementations of the present disclosure.

FIG. 4 shows a side view of a portion of the cab 18. In some implementations, bases 58 of the geopositioning antennas 56 may be located on a common plane. Thus, in some implementations, the geopositioning antennas 56 may extend a common distance from the roof 52. In other implementations, as shown in FIG. 4, a base 58 of each geopositioning antenna 56 is disposed on different planes 60 and 61, respectively. Thus, in some implementations, one of the geopositioning antennas 56 may extend farther from the roof 52 of the cab 18 than the other geopositioning antenna 56. For example, in some implementations, one or both of the geopositioning antennas 56 may be positioned within a range of three millimeters (mm) to 25 mm (0.1 inches (in) to 1.0 in.) above the roof 52. However, in other implementations, one or both of the geopositioning antennas 56 may be positioned above the roof 52 at a distance greater than 25 mm. For example, in some instances, one or both of the geopositioning antennas 56 may be mounted 30 mm (1.2 in.), 35 mm (1.4 in.), 40 mm (1.6 in.), 45 mm (1.8 in.), or 50 mm (2.0 in.) above the roof 52. Other distances of one or both of the geopositioning antennas 56 above the roof 52 are also contemplated. Further distances less than three millimeters are also contemplated. In some implementations, it is desirable to have the geopositioning antennas 56 disposed as closely to a common plane as is practical depending, for example, on the shape or configuration of a work vehicle to which the geopositioning antennas are mounted. As shown in FIGS. 1 and 4, the geopositioning antennas 56 are disposed on opposing corners of the work vehicle 10. One of the geopositioning antennas 56 is located at a first corner 62, and the other of the geopositioning antennas 56 is located at a second corner 64 opposite the first corner 62. Mounting of the geopositioning antenna 56 at the corner 62 provides for improved visibility through the window 54 formed in the roof 52.

Referring again to FIG. 4, another important aspect of the present disclosure is that the leading geopositioning antenna 56 is displaced from a leading edge 66 of the roof 52 by an offset 68. As a result, risk of damage to the leading geopositioning antenna 56 located at the front of the cab 18 is reduced. For example, during operation of the work vehicle 10, a hanging obstruction or other hazard, such as a tree limb, may contact the leading edge 66 of the roof 52 and, thus, be prevented from contacting the geopositioning antenna 56. Thus, the offset 68 works to prevent or reduce damage to the geopositioning antenna located at the first corner 62.

Figure 5:
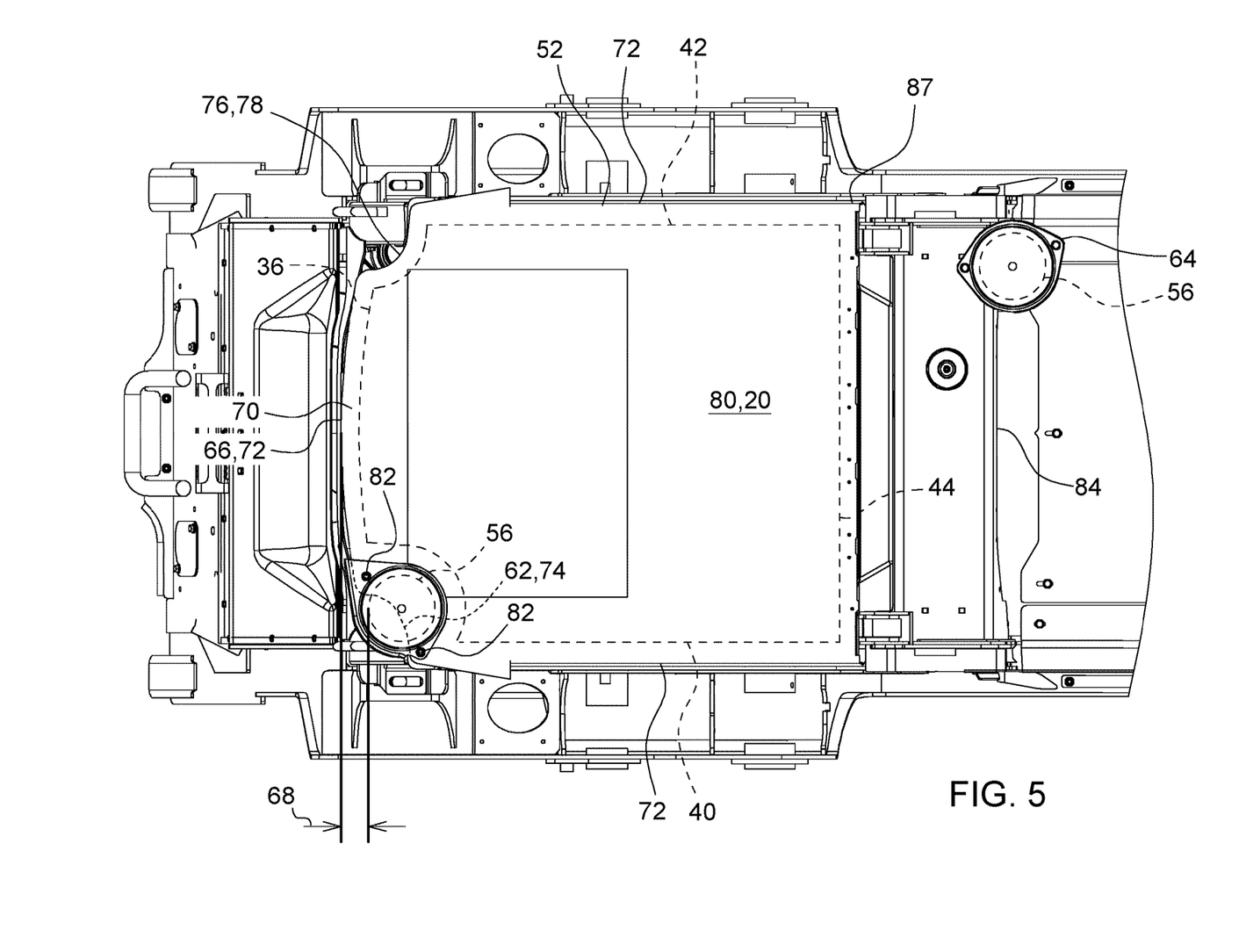
FIG. 5 is a top view of a portion of the work vehicle of FIG. 1 showing a top of the cab, according to some implementations of the present disclosure.

Another benefit provided by the manner in which geopositioning antennas 56 are mounted is that the geopositioning antennas 56 are mounted without the need for an opening formed through the roof 52 and into the interior cab space 20. FIG. 5 shows a top view of a portion of the work vehicle 10. Particularly, FIG. 5 show the roof 52 of the cab 18. The roof 52 includes a peripheral portion 70 extending between a peripheral edge 72 and side panels 36, 40, and 42. The leading edge 66 forms part of the peripheral edge 72. Recesses 74 and 76 are formed in the peripheral portions at front corners 62 and 78. Area 80, formed by the side panels 36, 40, 42, and 44, represents a top of the interior cab space 20.

Mounting locations, in the form of openings 82, are formed in the peripheral portion 70. As show, the openings 82 do not penetrate the interior cabin space 20. As a result, mounting of the forward geopositioning antenna 56 to the work vehicle 10 does not involve piercing the roof 52 into the interior cab space 20. Thus, mounting of the forward geopositioning antenna 56 provides the benefits of eliminating a potential leak path for water or other unwanted material into the interior of the cab 20. Further, avoiding formation of an opening in the roof 52 into the interior cab space 20 maintains integrity of and, therefore, does not adversely affect the roll over protection system (ROPS) and falling object protection system (FOPS) of the work vehicle 10.

As shown in FIGS. 2, 3, 4, and 5, the other geopositioning antenna 56, located at the second corner 64, is mounted to a portion of the frame 12. Particularly, the geopositioning antenna 56 located at the second corner 64 is mounted to a back surface 84 of a portion of the frame 12 located adjacent to the fourth side panel 44. In the illustrated example, the back surface 84 is a generally vertically-oriented surface when the work vehicle 10 is located on level ground and conventionally oriented.

As shown in FIG. 3, the geopositioning antennas 56 are separated by a distance 85. Generally, accuracy of the geopositioning antennas 56 increases as the distance 85 increases. Consequently, the rear or trailing geopositioning antenna 56 is mounted to the frame 12, i.e., at the second corner 64, as opposed to corner 87 (shown in FIG. 5) in order to increase the distance between the geopositioning antennas 56.

Figure 6:
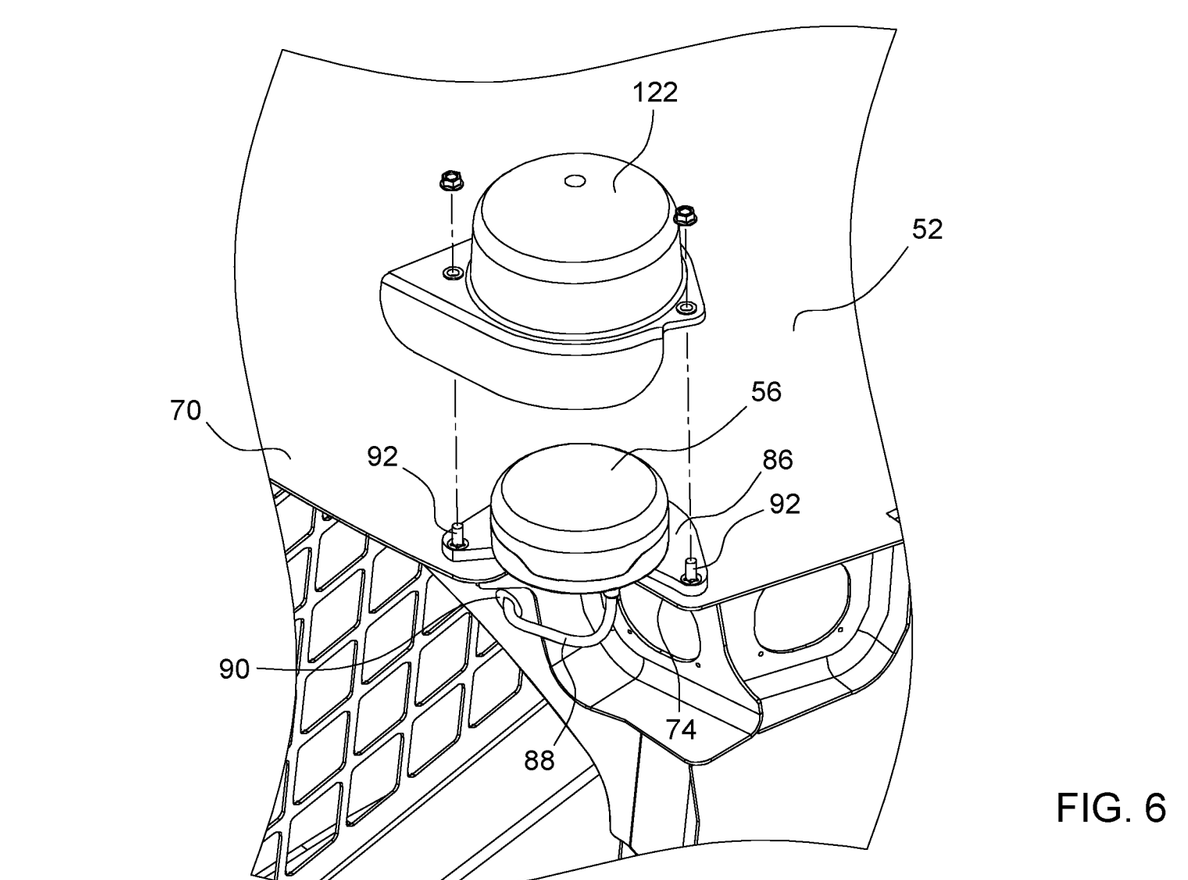
FIG. 6 is a detail view of a geopositioning antenna located at a corner of a roof of a cab of work vehicle, according to some implementations of the present disclosure.

FIG. 6 is a detail view of the geopositioning antenna 56 located at the first corner 62. As shown, the geopositioning antenna 56 is coupled to the peripheral portion 70 of the roof 52 by a bracket 86. A portion of the geopositioning antenna 56 overhangs the recess 74. This overhang provides for routing of a wiring harness 88 and avoids the need for an opening formed in the roof 52. Rather, the routing of the wiring harness 88 facilitated by the recess 74 allows for the wiring harness 88 to be routed through an opening 90 formed in the first side panel 36. Consequently, structural rigidity and performance of the roof 52 is improved. The bracket 86 attaches to the peripheral portion 70 of the roof 52 via fasteners 92 that extend through openings 82 (shown in FIG. 5) formed in the peripheral portion 70.

Figure 7:
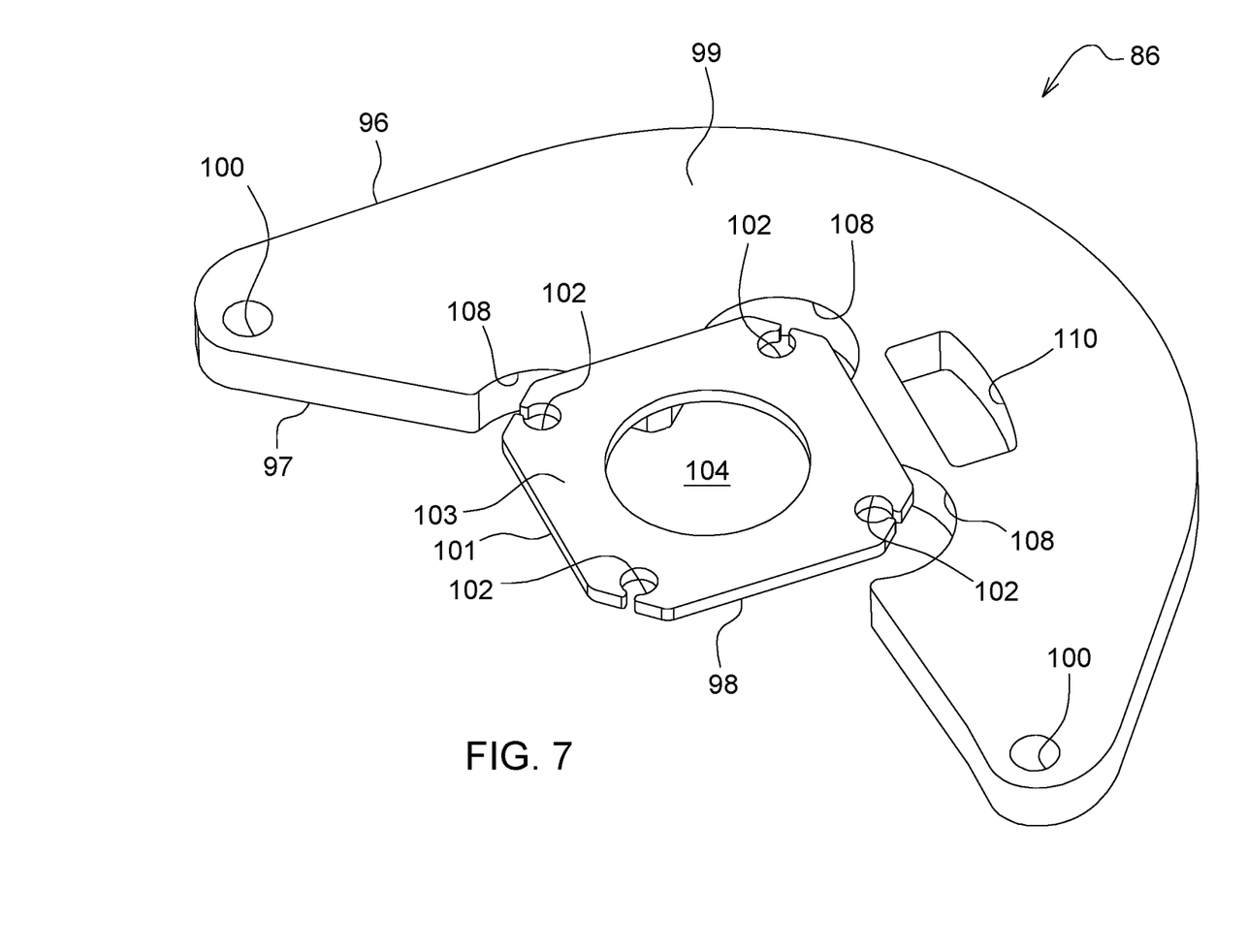
FIG. 7 is a perspective view of an example bracket used to mount a geopositioning antenna to the roof of a cab, according to some implementations of the present disclosure.

FIG. 7 is a perspective view of the bracket 86. The bracket 86 includes a base 96 and an antenna mount 98 attached to the base 96. The base 96 and the antenna mount 98 have a planar form. Consequently, in the illustrated example, the base 96 defines a first planar portion; the antenna mount 98 defines a second planar portion; and the antenna mount 98 overlays the base 96. The base 96 includes opposing surfaces 97 and 99. In some implementations, one or both of the surfaces 97 and 99 may be planar surfaces. The surfaces 97 and 99 are parallel to each other. In other implementations, the surfaces 97 and 99 may not be parallel relative to each other. The surface 97 abuts a surface of the roof 52, as described in more detail below. The antenna mount 98 also includes opposing surfaces 101 and 103. In some implementations, one or both of the surfaces 101 and 103 may be planar surfaces. Similar to the base 96, the opposing planar surfaces 101 and 103 are parallel to each other. In other implementations, the planar surfaces 101 and 103 may not be parallel relative to each other. The surface 99 of the base 86 abuts the surface 101 of the antenna mount 98.

As shown, the base 96 and the antenna mount 98 have a flat shape and may be formed from metal plate. Further, in the illustrated example, the base 96 has a thickness that is greater than a thickness of antenna mount 98. However, the scope of the disclosure is not so limited. Rather, in other implementations, thickness of the base 96 and antenna mount 98 may be the same, or the thickness of the antenna mount 96 may be greater than a thickness of the base 96. In some implementations, a thickness of the base 96 may be a result, at least in part, of a size of fasteners used to connect the geopositioning antenna 56 to the antenna mount 98, such as a size of a head of the fasteners used to connect the geopositioning antenna 56 to the antenna mount 98. Generally, the base 96 and the overall antenna mount 98 provides a rigid platform operable to reduce or eliminate deflection of the antenna mount 98 and, thus, displacement of the geopositioning antenna 56 relative to the cab 18, frame 12, or both.

The base 96 and the antenna mount 98 are fixedly attached to each other. For example, the base 96 and the antenna mount 98 may be joined via welding or some other joining technique. In other implementations, the base 96 and the antenna mount 98 may form an integral, unitary component. For example, in some implementations, the bracket 86 may be a single piece of material formed from casting, forging, machining, or another type of manufacturing technique. The base 96 includes apertures 100 that align with openings 82 formed in the peripheral portion 70 of the roof 52. The fasteners 92 (shown in FIG. 6) are received into the aligned openings 82 and apertures 100 to secure the bracket 86 to the peripheral portion 70 of the roof 52. The antenna mount 98 includes a plurality of apertures 102 and a central opening 104. The plurality of apertures 102 are configured to receive fasteners 106 (shown in FIG. 8) to secure the geopositioning antenna 56 to the bracket 86. The central opening 104 is included to reduce the mass of the antenna mount 98 and, thus, the bracket 86. In other implementations, the central opening 104 may be omitted.

The base 96 also includes a plurality of crescent-shaped recesses 108. The bracket mount 98 is oriented with respect to the base 96 such that the crescent-shaped recesses 108 align with corresponding apertures 102 formed in the antenna mount 98. The crescent-shaped recesses 108 may be sized to accommodate a tool, such as a socket, used to install the fasteners 106. In some implementations, the base 96 may also include an opening 110. The opening 110 may align with one or more lights disposed on the base 58 of the geopositioning antenna 56. In other implementations, the opening 110 may be omitted.

Construction of the bracket 86 results a low-profile bracket that positions the geopositioning antenna 56 above the roof 52 of the cab 18 and gives the geopositioning antenna 56 the greatest vertical dimension of the work vehicle 10 (when the work vehicle 10 is located on level ground and conventionally oriented and when the attachment 24 is in the lowered position) while reducing a the vertical distance that the mounted geopositioning antenna extends from the roof 52 of the cab 18.

Figure 8:
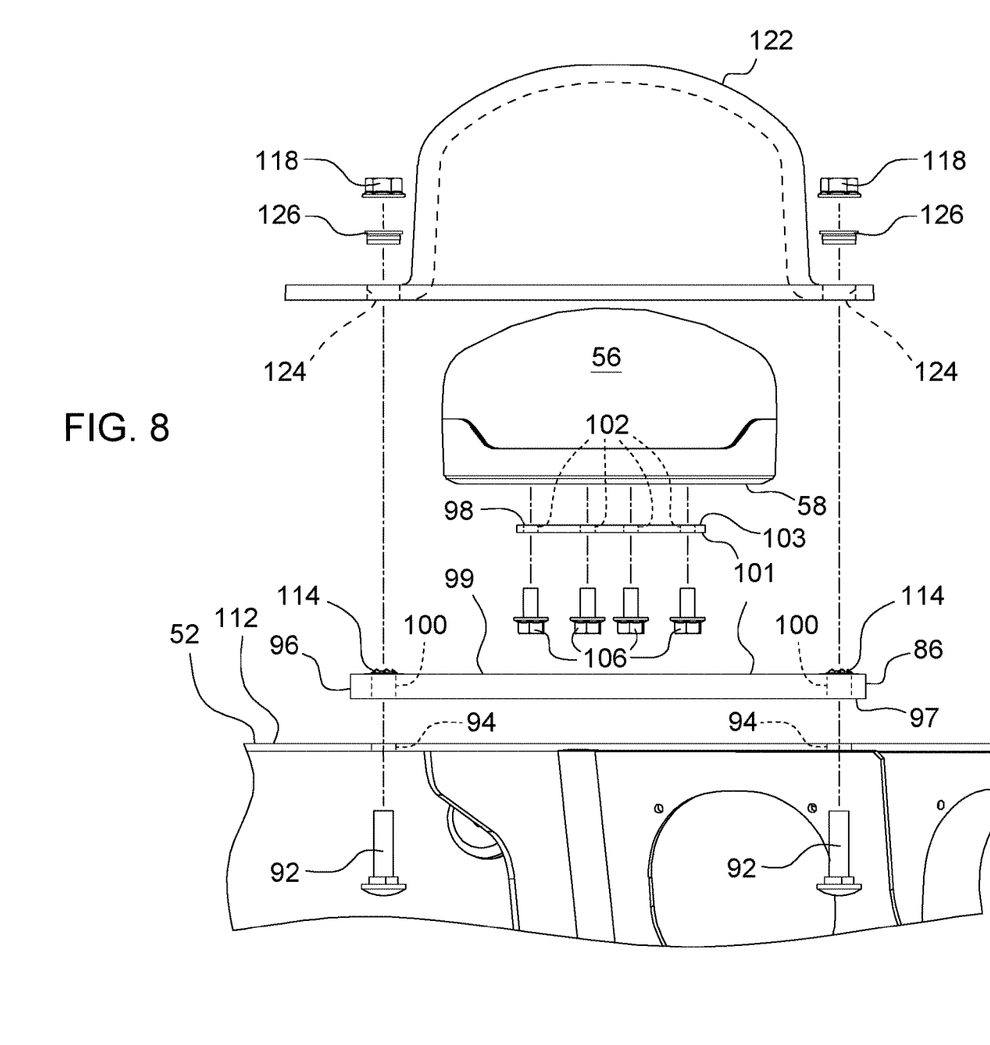
FIG. 8 is an exploded view of an example geopositioning antenna, bracket, and associated mounting hardware, according to some implementations of the present disclosure.

FIG. 8 shows an exploded view that illustrates mounting of the forward geopositioning antenna 56 to the peripheral portion 70 of the roof 52 of the cab 18. The planar surface 97 of the base 96 adjacent to a surface 112 the roof 52 of the cab 18 abuts the roof 52. Fasteners 92, which may be in the form of bolts, extend through the aligned openings 82 and apertures 100. In this example, a push nuts 114, and nuts 118 are coupled to the fasteners 92 to secure the bracket 86 to the roof 52. The surface 103 of the antenna mount 98 adjacent to the base 58 of the geopositioning antenna 56 contacts the base 58 of the geopositioning antenna 56. Fasteners 106 are received through the apertures 102 and into the geopositioning antenna 56 to secure the geopositioning antenna 56 to the bracket 86.

A cover 122 may also be included, as shown in FIG. 8. The cover 122 is mounted to the bracket 86 and covers and protects the geopositioning antenna 56. The cover 122 includes apertures 124 and, in some implementations, collars 126 received into the apertures 124. The cover 122 may be formed from a polymeric material. Therefore, collars 126 may be received into the apertures 124 so that the fasteners 92 and associated push nut 114, and nut 118 do not crush and damage the cover 122. The collars 126 also facilitate generations of a satisfactory clamp load to retain the bracket 86 and geopositioning antenna 56 to the roof 52 of the cab 18.

In some implementations, the push nut 114 may be eliminated. In some implementations, the push nut 114 may be included so as to retain the bracket 86 and, consequently, the geopositioning antenna 56 when the nuts 118 are removed in order, for example, to remove the cover 122. Removal of the cover 122 may be desired in order to gain access to the geopositioning antenna 56. The push nuts 114 retain the fasteners 92 so that the bracket 86 remains in position on the roof 52 at the corner 62. As a result, the geopositioning antenna 56 remains in position relative to the work vehicle 10. Maintaining the geopositioning antenna 56 in position with the cover 122 removed may be desirable when servicing the geopositioning antenna 56. In other implementations, the cover 122 may be omitted. Consequently, the mounting of geopositioning antenna 56 at the first corner 62 provides for placing the geopositioning antenna 56 (or the associated cover 122) at a highest point extending perpendicularly from the roof 52 while, at the same time, reducing the distance by which the geopositioning antenna 56 extends from the roof 52.

Figure 9:
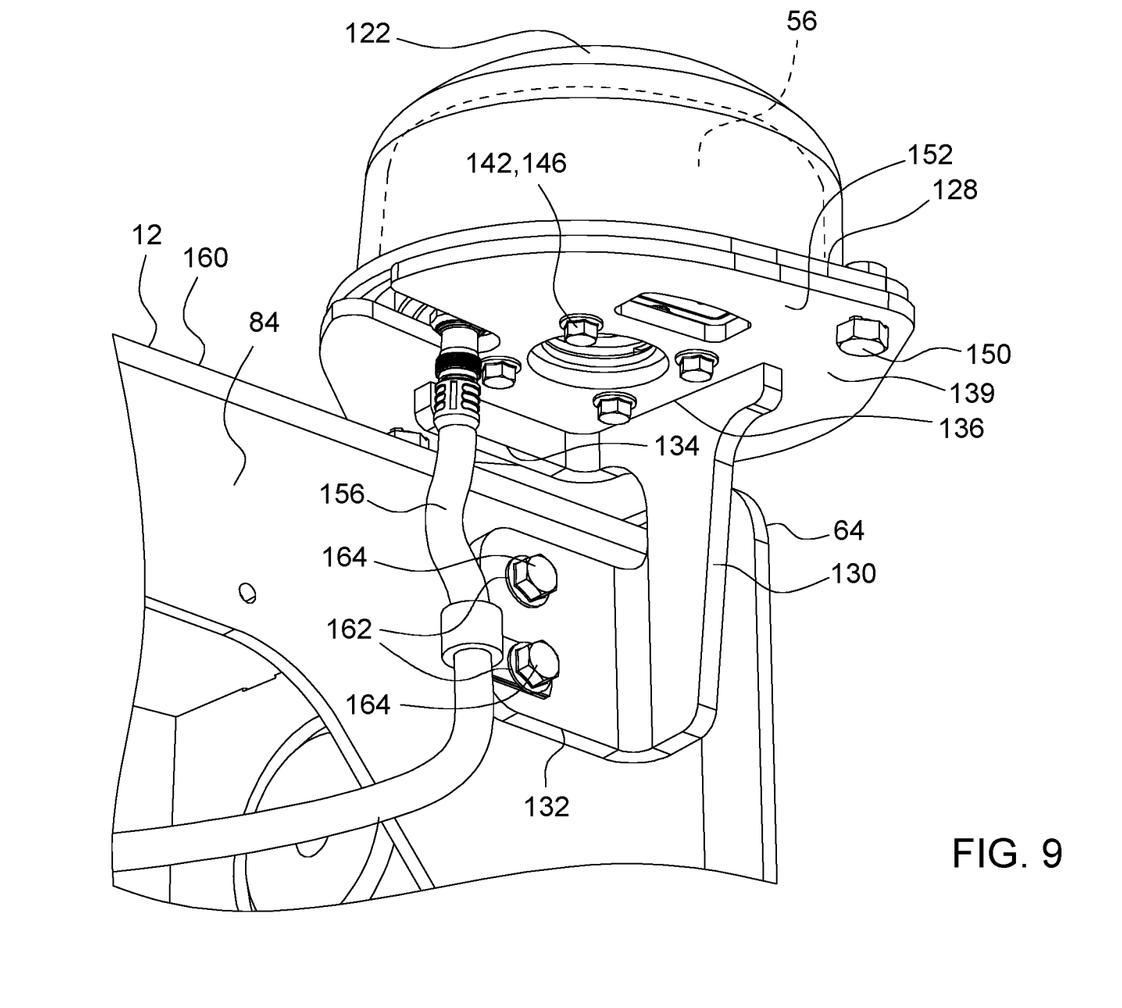
FIG. 9 is a detail view of an example mounting configuration of a geopositioning antenna mounted to a frame of a work vehicle, according to some implementations of the present disclosure.

FIG. 9 is a detail view showing the geopositioning antenna 56 mounted at the second corner 74 on the back surface 84 of the frame 12. The geopositioning antenna 56 is mounted to the back surface 84 with a bracket 128. The bracket 128 includes a stem 130, a first lateral portion 132 extending from the stem 130 and a second lateral portion 134 extending from the stem 130. An end 136 of the bracket 128 defines an L-shape, and a base 138 is attached to the end 136. The base 138 includes opposing surfaces 137 and 139. In some implementations, the surfaces 137 and 139 are parallel to each other. In some implementations, the surfaces 137 and 139 may not be parallel to each other. In still other implementations, one or both of the surfaces 137 and 139 are planar surfaces.

Figure 10:
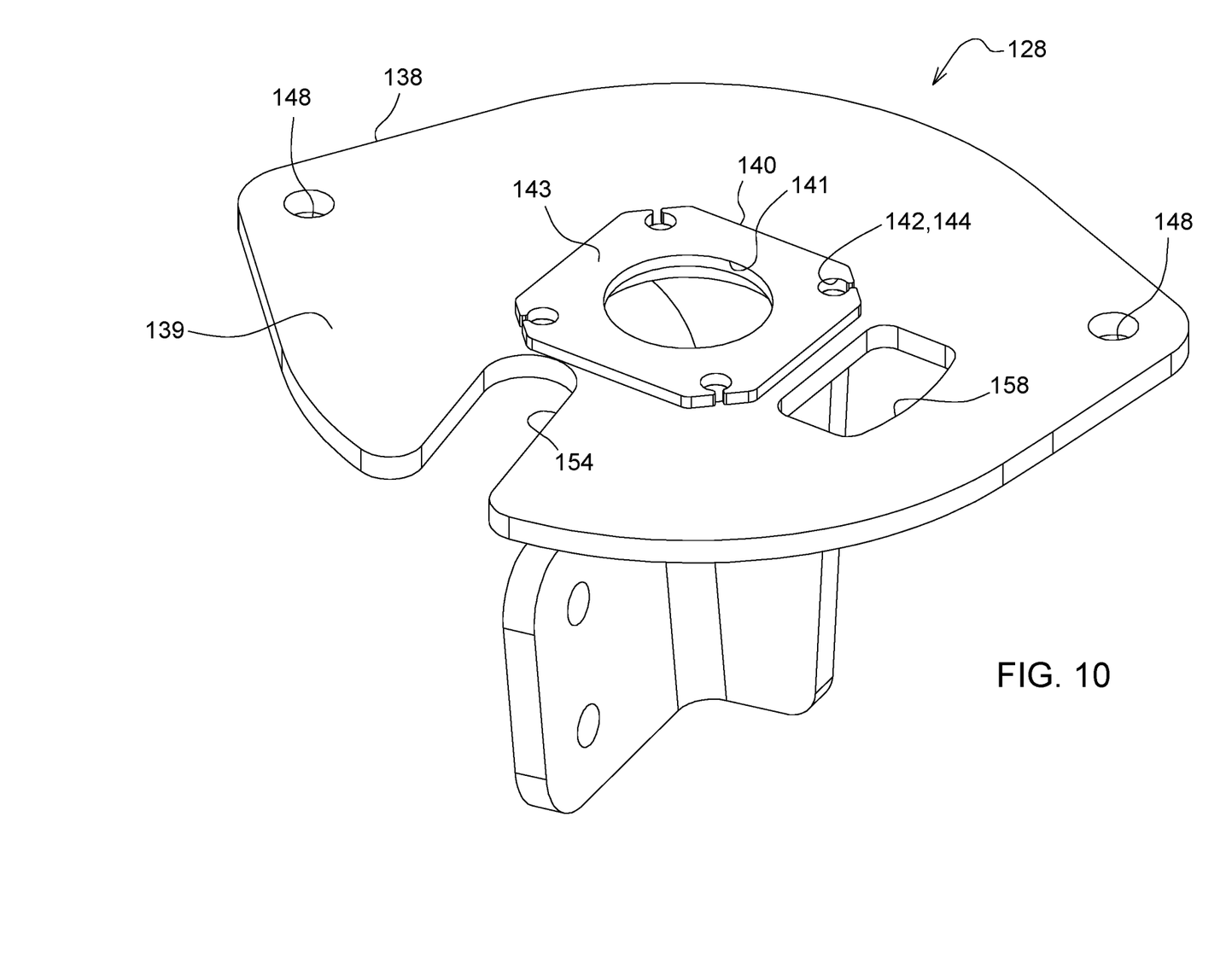
FIG. 10 is a perspective view of an example mount for mounting a geopositioning antenna to a frame of a work vehicle, according to some implementations of the present disclosure.

As shown in FIG. 10, an antenna mount 140 is attached to the base 138. The antenna mount 140 includes opposing surfaces 141 and 143. In some implementations, the surfaces 141 and 143 are parallel to each other. In some implementations, the surfaces 141 and 143 may not be parallel to each other. In still other implementations, one or both of the surfaces 141 and 143 are planar surfaces.

In some implementations, the base 138 and antenna mount 140 are planar in form. The base 138 and antenna mount 140 may be formed from plate material. The thicknesses of and the relative thicknesses of the base 138 and the antenna mount 140 may be similar to that described above with respect to the base 96 and the antenna mount 98. The antenna mount 140 may be fixedly mounted to the base 138, such as by welding or another joining technique. In other implementations, the antenna mount 140 and the base 138 may form an integral, unitary component. The surface 137 of the base 138 connects to the end 136 of the bracket 128. The surface 139 abuts the surface 141 of the antenna mount 140, and the surface 143 of the antenna mount 140 abut the base 58 of the geopositioning antenna 56. Apertures 142 formed in the base 138 align with apertures 144 formed in the antenna mount 140. Fasteners 146 are received into the aligned apertures 142 and 144 to secure the geopositioning antenna 56 to the bracket 128.

In some implementations, the base 138 also includes apertures 148. The apertures 148 receive fasteners to secure a cover, which may be similar to cover 122, to the bracket 128. In some implementations, nuts 150, such as weld nuts, may be attached to a surface 152 of the base 138 and aligned with the apertures 148 to receive the fasteners used to attach the cover. The base 138 also includes a slot 154. The slot 154 provides passage of a wire harness 156 that extends from the geopositioning antenna 56. The wire harness 156 extends through the slot 154 and through an opening in the side panel 44 of the cab 18 (not shown). The base 138 may also include an opening 158 through which one or more lights of the geopositioning antenna 56 may be visible.

Referring again to FIG. 9, the second lateral portion 134 of the bracket 128 extends laterally beyond the first lateral portion 132. As a result, the second lateral portion 134 and a portion of the geopositioning antenna 56 extends over a portion of a top surface 160 of the frame 12. The first lateral portion 132 also includes apertures 162 through which fasteners 164 extend to secure the bracket 128 to the frame 120 of the work vehicle 10.

Although the work vehicle 10 and the geopositioning antennas 56 are described in the context of track loaders and skid steers, the scope of the disclosure is not so limited. Rather, other types of work vehicles or other vehicles are within the scope of the present disclosure. Further, words of orientation, such as "up," "down," "top," "bottom," "above," "below," "leading," "trailing," "front," "back," "forward," and "rearward" are used in the context of the illustrated examples as would be understood by one skilled in the art and are not intended to be limiting of the disclosure. For example, for a particular type of vehicle in a conventional configuration and orientation, one skilled in the art would understand these terms as the terms apply to the particular vehicle.

Without in any way limiting the scope, interpretation, or application of the claims appearing below, a technical effect of one or more of the example implementations disclosed herein is to reduce a distance that geopositioning antennas extend from a portion of a work vehicle while maintaining the geopositioning antennas at a location that is vertically higher than any other part of the work vehicle and maintaining the geopositioning antenna inward of the work vehicle to reduce the risk of impact and damage to the geopositioning antenna.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A vehicle comprising:
   a frame;
   a cab mounted to the frame, the cab defining an interior cab space, the cab comprising:
      a side panel defining a first side of the interior cab space; and
      a roof defining a second side of the interior cab space, the roof comprising a peripheral portion extending beyond the side panel and an edge formed along the peripheral portion; and
   a first antenna coupled to the cab such that the antenna is located inwards of the edge.

2. The vehicle of claim 1, further comprising a mounting aperture formed in the peripheral portion, the mounting aperture used to mount the first antenna to the cab.

3. The vehicle of claim 1, further comprising a bracket comprising:
   a base comprising a first planar portion; and
   an antenna mount comprising a second planar portion overlaying and contacting the first planar portion of the base, the first planar portion comprising a first surface configured to abut the roof of the cab; and the second planar portion contacting the first planar portion.

4. The vehicle of claim 3, wherein the first planar portion further comprises a second surface opposite the first surface,
   wherein the second planar portion comprises a first surface and a second surface opposite the first surface,
   wherein the second surface of the first planar portion abuts the first surface of the second planar portion, and
   wherein first antenna mounts to the second surface of the second planar portion.

5. The vehicle of claim 4, wherein the first surface of the first planar portion is parallel to the second surface of the second planar portion.

6. The vehicle of claim 3, further comprising a first mounting aperture formed in the peripheral portion, wherein the bracket comprises a second mounting aperture formed in the first planar portion, wherein the first mounting aperture aligned with the second mounting aperture, and wherein the aligned first mounting aperture and second mounting aperture are configured to receive a fastener to secure the bracket to the roof.

7. The vehicle of claim 3, wherein the second planar portion comprises an aperture, and wherein the aperture is configured to receive a fastener to secure the antenna to the bracket.

8. The vehicle of claim 3, wherein the first planar portion and the second planar portion form a unitary, integrally formed component.

9. The vehicle of claim 1, further comprising a second antenna, the first antenna and the second antenna located at a common distance relative to the roof.

10. The vehicle of claim 9, wherein a base of the first antenna and a base of the second antenna are located on a common plane.

11. The vehicle of claim 9, wherein the first antenna is coupled at a first corner of the roof, and wherein the second antenna is coupled to a second corner of the frame diagonally offset from the first corner.

12. The vehicle of claim 9, further comprising a bracket configured to connect the second antenna to the frame, the bracket comprising:
 a stem;
 a first lateral portion extending from a first end the stem; and
 a second lateral portion extending from a second end of the stem, the first lateral portion laterally offset from the second lateral portion.

13. The vehicle of claim 12, wherein the first lateral portion extends along a portion of the frame and offset from a surface of the frame on a side of the frame opposite the cab.

14. The vehicle of claim 12, wherein the second lateral portion is attached to a side of the frame.

15. The vehicle of claim 1, further comprising a wiring harness extending from the antenna, wherein the antenna extends from outwardly from the cab in a first direction, wherein the wiring harness extends in a second direction opposite the first direction, and wherein the wiring harness extends into the interior cab space via an opening formed in the side panel.

16. The vehicle of claim 15, wherein the peripheral portion of the roof defines a recess, and wherein the wiring harness extends through the recess.

17. The vehicle of claim 1, wherein the roof further comprises a central portion overlaying the interior cabin space, the peripheral portion extending beyond central portion, and wherein the central portion is free of a mounting aperture for coupling the antenna to the roof.

18. The vehicle of claim 1, wherein the vehicle is a tracked loader or a skid steer.

19. The vehicle of claim 1, wherein a portion of the antenna at a location having the greatest distance measured perpendicular to the roof defines an outermost portion of the vehicle that extends from the roof of the cab.

20. A work vehicle comprising:
 a frame;
 a cab mounted to the frame, the cab defining an interior cab space, the cab comprising:
  a first side panel defining a first side of the interior cab space, the first side defining a front side of the work vehicle;
  a second side panel defining a second side opposite the first side, the second panel defining a rear side of the work vehicle; and
  a roof extending from the first side panel to the second side panel and defining a third side, the first side, the second side, and the third side at least partially defining the interior cab space, the roof comprising:
   a peripheral portion extending beyond the first side panel; and
 a first antenna coupled to the cab such that the antenna is located inwards of the edge;
 a first bracket adapted to couple the first antenna to a first corner of the roof along the peripheral portion, the first bracket comprising:
  a base comprising a first planar portion;
  an antenna mount comprising a second planar portion overlaying and contacting the first planar portion, the first planar portion comprising a first surface configured to abut the roof of the cab, and the second planar portion abutting the first planar portion; and
  a first mounting aperture formed in the first planar portion; and
 a second mounting aperture formed in the peripheral portion, the first mounting aperture aligned with the second mounting aperture to receive a fastener to secure the bracket to the roof.

* * * * *